UNITED STATES PATENT OFFICE.

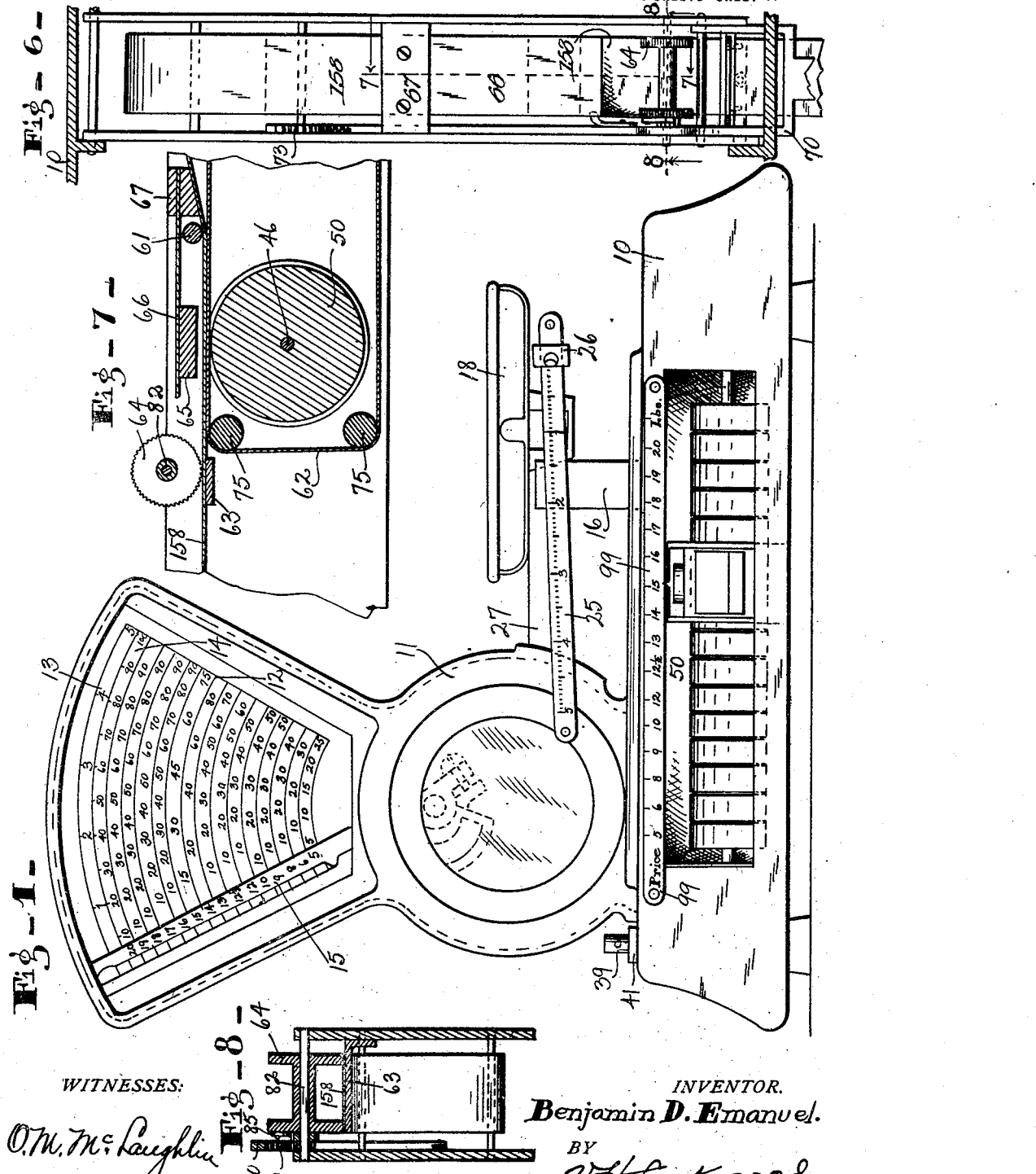

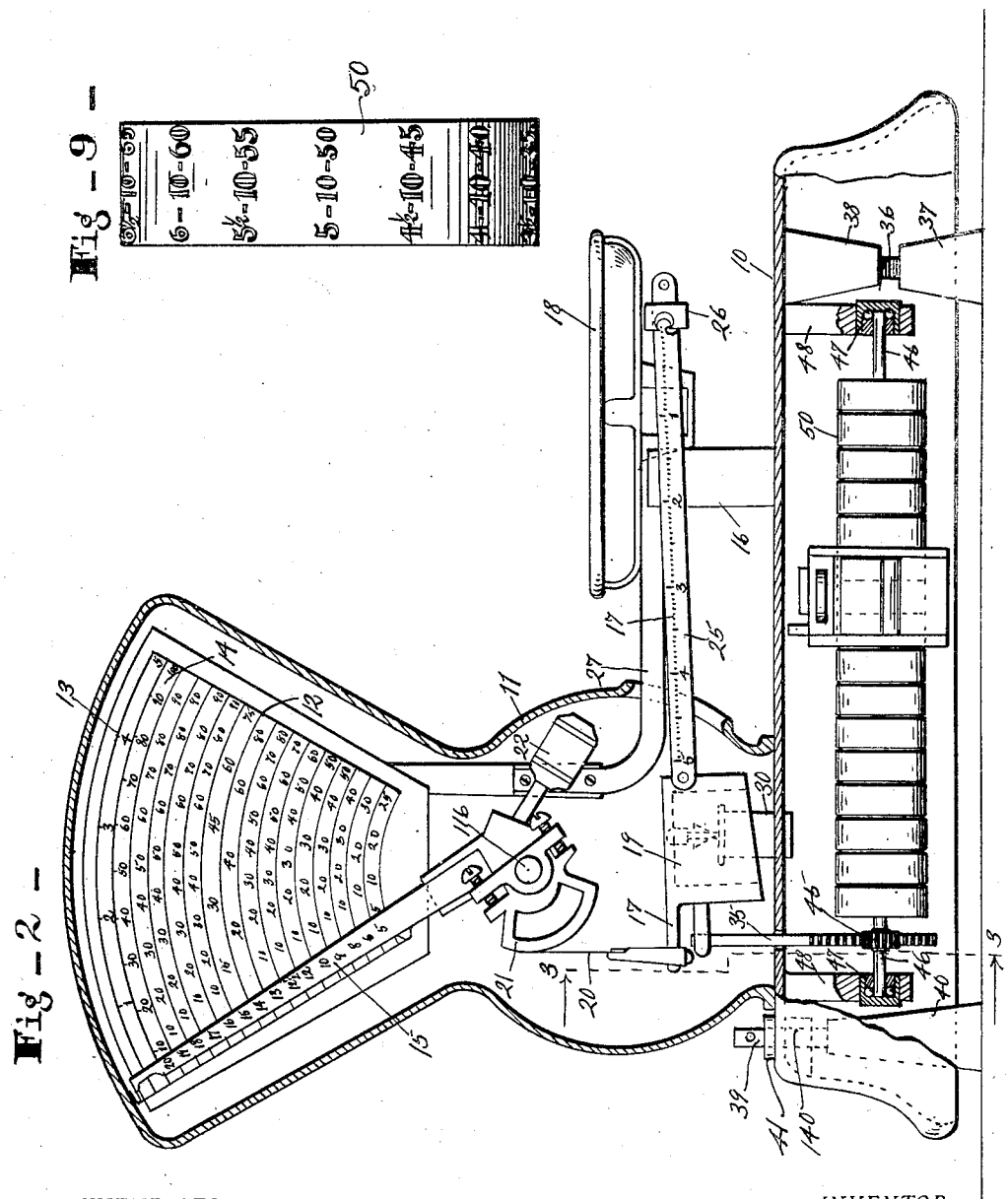

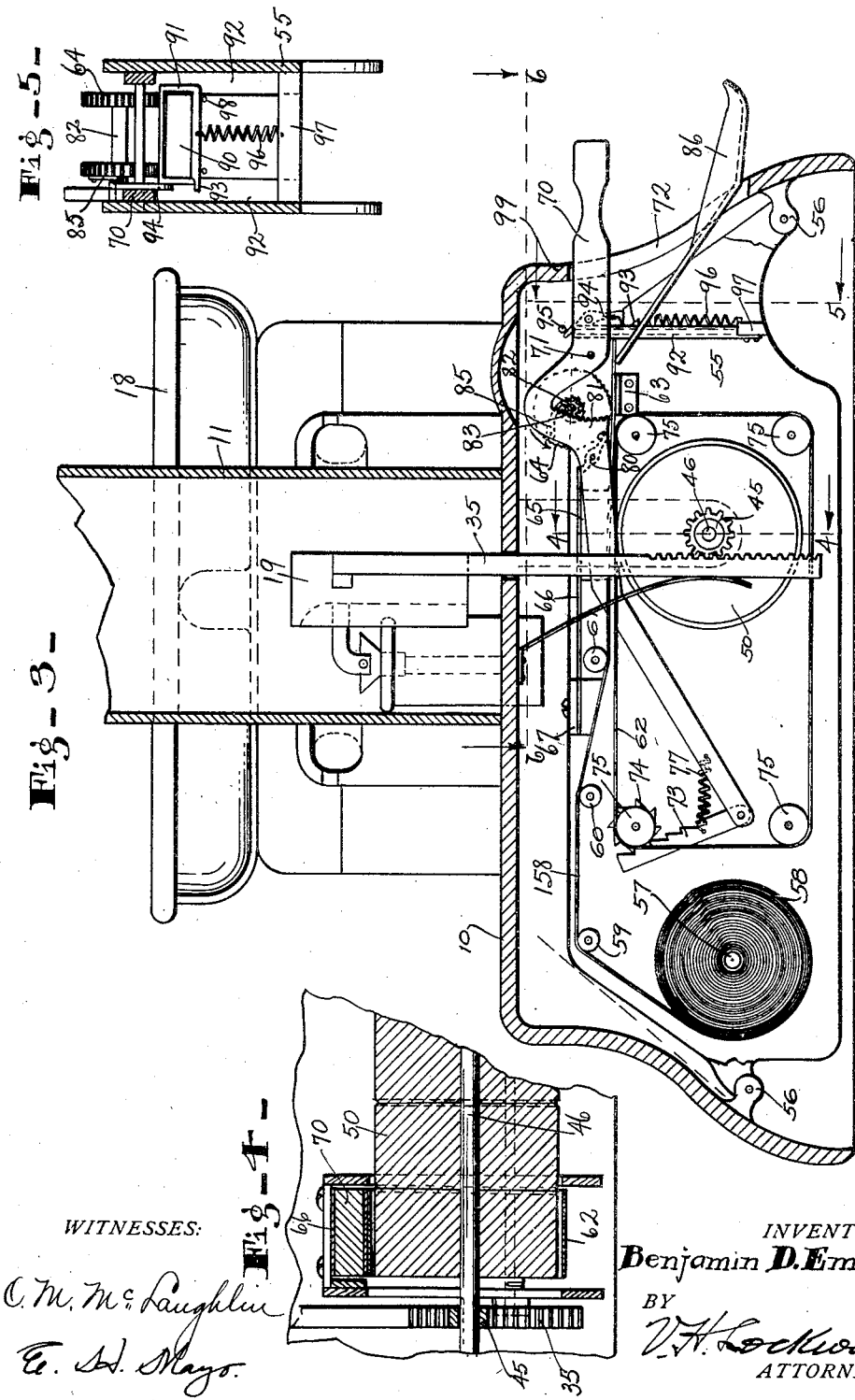
B. D. EMANUEL.
WEIGHING SCALE.
APPLICATION FILED JUNE 19, 1911. RENEWED NOV. 16, 1915.
1,189,196. Patented June 27, 1916.
3 SHEETS—SHEET 3.
WITNESSES:
C. M. McLaughlin
E. W. Mayo
INVENTOR.
Benjamin D. Emanuel.
BY
V. H. Lockwood
ATTORNEY.

BENJAMIN D. EMANUEL, OF ANDERSON, INDIANA, ASSIGNOR, BY MESNE ASSIGNMENTS, TO THE COMPUTING SCALE COMPANY, OF DAYTON, OHIO, A CORPORATION.

WEIGHING-SCALE.

1,189,196.   Specification of Letters Patent.   Patented June 27, 1916.

Application filed June 19, 1911, Serial No. 634,154. Renewed November 16, 1915. Serial No. 61,860.

*To all whom it may concern:*

Be it known that I, BENJAMIN D. EMANUEL, a citizen of the United States, and a resident of Anderson, county of Madison, and State of Indiana, have invented a certain useful Weighing-Scale; and I do hereby declare that the following is a full, clear, and exact description thereof, reference being had to the accompanying drawings.

The object of this invention is a combination with weighing scales, particularly computing scales, of means actuated by the scale beam or some part actuated by said beam for marking or printing tickets showing the weight, price-per-unit of weight, total value or other data relating to the article being weighed on the scale.

The device is intended to be used by retail merchants, but its use is not limited to any particular class of trade or for any particular commercial purposes. Heretofore when making a purchase in a retail store, the clerk after weighing the commodity to be sold, operates an independent cash register which issues a ticket showing the total amount to be paid for the commodity. The customer then takes this ticket to a cashier who operates another cash register and which is merely used for keeping a record of the money received. Thus the complete transaction requires the use of a weighing scale and two cash registers and yet the merchant has no way of knowing that the clerk weighed the commodity accurately, nor does the customer know that the clerk computed the money accurately. Hence, this invention is to simplify both the operation and mechanism required to accomplish the object heretofore set forth and also to satisfy the merchant and the customer that the showing on the tickets is absolutely correct because it has been mechanically effected in connection with the weighing scale.

The nature of the invention will be understood from the accompanying drawings and the following description and claims.

In the drawings, Figure 1 is a front elevation of the machine. Fig. 2 is the same as Fig. 1, but with a portion of the casing broken away. Fig. 3 is a vertical transverse section on the line 3—3 of Fig. 2. Fig. 4 is a vertical transverse section on the line 4—4 of Fig. 3. Fig. 5 is a vertical transverse section on the line 5—5 of Fig. 3. Fig. 6 is a horizontal section on the line 6—6 of Fig. 3. Fig. 7 is a vertical section on the line 7—7 of Fig. 6. Fig. 8 is a vertical longitudinal section on the line 8—8 of Fig. 6. Fig. 9 is a front elevation of one of the type wheels on an enlarged scale.

In detail there is shown herein for the purpose of illustrating the nature of the invention a scale base 10 having a housing 11 of familiar type mounted thereon in which there is located a chart 12 having a row 13 of indications showing weight, that is, pound and ounce graduations, and also rows 14 of numerals and graduations for total values. Within said housing an indicator 15 is fulcrumed on a shaft 116 and on said indicator there are numerals indicating prices-per-unit of weight, said prices registering with the corresponding rows of total values.

On the base there is a stand 16 on which the scale beam 17 is fulcrumed between its ends. On its outer end said scale beam carries a load receiving member, platform or pan 18, and at its inner end it is provided with a weight 19 adapted normally to overbalance the platform 18 and a connection 20 extends from the inner end of the scale beam to a segment 21 secured to the indicator mechanism near the shaft 116 and arranged in such manner that when there is no load the weight 19 acts through the beam 17 and the connections 20 and 21 will return the indicator 15 to zero, but when a load is applied on the platform 18 the other end of the scale beam will be elevated correspondingly and thus permit the pendulum weight 22 which extends angularly from the indicator near its fulcrum, to descend by gravity and thus move or actuate the indicator 15 in accordance with the weight of the load.

The scale beam has a tare beam 25 secured to it with a poise 26 thereon and also a check 27 extending from the bottom of the scale pan into the housing and then turned upwardly. There is also a dash pot 30 connected with the inner end of the scale beam. These parts, in fact all of the parts so far mentioned in this description, are old in the art of computing scales.

Within the base 10 which is hollow, suitable ticket printing, cutting and discharging mechanism is provided which is actuated by the scale beam and in proportion to the movement of the scale beam under the influence of the load through the rack bar 35 or any other suitable connection. Said base 10 is provided with a leveling and supporting means near each end, that at the right-hand end consisting of a threaded bolt 36 on the enlarged base or head 37 and which screws into a downwardly extending lug 38 from the base plate. At the left-hand end there is a threaded bolt 39 having an enlarged head 40 on the lower end thereof and which screws through the base plate and a lug 140 on the under side thereof and it is locked by a nut 41 on the upper side of the base plate.

The rack bar 35 heretofore referred to as being actuated by the scale beam, meshes with a pinion 45 on a shaft 46 which at each end has bearings 47 in arms 48 which extend down from the base plate. The shaft 46 is preferably horizontal and upon which there is rigidly secured a number of type wheels 50 for each price-per-unit of weight shown on the indicator 15 of the scale. In the particular scale shown there are fifteen prices-per-unit of weight and, therefore, there are fifteen of said type wheels. There is also an extra type wheel for merely indicating weight. Each type wheel has on it, as shown in Fig. 9, a number of horizontal rows of numerals or other indications. Each row of such indications consists of one numeral indicating weight and at the right-hand of said numeral there is another numeral indicating price-per-pound and at the right-hand side of the latter there is another numeral indicating the total value. Thus one horizontal row of numerals would read as follows: "5—10—.50." Hence, on each wheel there are three circumferential rows of numerals, the one to the left-hand end representing weights in half pounds or quarter pounds, as desired, up to the capacity of the chart 12. The second or middle circumferential row of numerals is the price-per-unit for that particular wheel so that all of said prices-per-unit numerals are alike in any one row. The right-hand circumferential row represents total value at said price-per-unit of the commodity having the weights indicated in the left-hand row.

The right-hand wheel 50 has on it only one circumferential row of weights. Thus the circumferential row of weights is the same on every wheel, the circumferential row of prices-per-unit vary according to the wheel, and the total values vary according to the other indications on each wheel. While the part mounted on the shaft 46 is herein referred to as a series of wheels 50, it is obvious that if preferred, a single cylinder divided into peripheral sections with the various tickets of indicating numerals as herein described, would be the same in effect as the entire series of wheels, each secured on the shaft and rotated therewith.

If a commodity weighing one-half a pound is placed on the platform, it is obvious that the rack bar 35 will be given a slightly vertical movement and only to a slight extent rotate said type wheels 50. If, on the other hand, a four-pound article be placed on the platform, the inner end of the beam will be so considerably moved that the type wheels will be given almost an entire revolution. Hence, the revolving movement of the type wheels will be in exact relation to the weight on the platform and to the movement of the indicator 15. The arrangement is such that the load on the platform will move the type wheels 50 so that the top weight numerals on the type wheels will correspond with the weight on the chart indicated by the indicator 15.

A comparatively narrow hollow frame 55 is mounted within the hollow base so as to be slidable on horizontal rods or guides 56 extending inwardly from the front and rear walls of the base, see Fig. 3. This frame 55 has side walls in which a spool 57 is mounted for carrying a ticket strip roller 58, the same being a continuous strip or tape from which tickets or slips may be cut and its width is substantially the same as the width of one of the type wheels 50. From the spool 57 said ticket strip passes over rollers 59 and 60 extending horizontally in the upper part of the frame 55 and thence under a roller 61 similarly mounted and in the same plane as the other two rollers 59 and 60 and thence over the printing ribbon 62 and type wheels 50 and fixed plate 63 under the feed wheel 64. A hammer 65 is secured on the free end of a spring 66 which extends from the fixed block 67 so that after the hammer has been elevated and released it, in its return downward movement, will strike the ticket strip and press it against the ribbon and type wheel and cause the impression or printing of a ticket.

A hand-operated lever 70 is fulcrumed to the frame 55 by a pin 71 between its ends, one end extending out through a slot 72 in the front part of the base far enough to be manipulated. The other end of the lever 70 extends inwardly and at its extreme inner end it carries a rack bar 73 which is held by a spring 77 against a ratchet 74 on one of the rollers 75 which carry the printing ribbon 62 and actuates the same. The rollers 75 are mounted in the side walls of the frame 55. The depression of the outer end of the lever 70 causes the actuation of the rack bar 73 and thus the feeding of the printing ribbon.

The hammer 65 is elevated by a trip 80 which is pivoted to one side of the lever 70 far enough to the rear of the fulcrum 71 so that as the outer end of said lever 70 is depressed, the end of the trip 80 will engage the extreme end of the spring 66 and elevate it and then escape from said spring so that the rebound of the hammer causes the printing. The return movement of the lever 70 will again move the trip 80 under the extreme end of the spring 66. For that purpose the trip 80 has limited movement on its pivot.

The lever 70 on its return movement after it has been depressed, actuates the feeding wheel 64 and feeds the ticket strip 158 outward after it has been printed. This is done by reason of a rack 81 secured to the lever 70 in position to engage a pinion 82 loosely mounted on a shaft 83 which carries the feed wheel 64. A spring pawl 85 is pivoted to one end of the feed wheel 64 and engages said pinion 82, the arrangement being such that when the outer end of the lever 70 is depressed the inner end thereof will be elevated and cause the printing, as heretofore said, and will also cause movement of the pinion 82 in one direction, but such movement of said pinion is not transmitted to the feed wheel 64. Upon the return movement of said lever 70, however, the movement of said pinion 82 is transmitted to the feed wheel 64 by the pawl 85 and said feed wheel is moved in the direction of the arrow, substantially one revolution, since the pinion 82 is relatively small and that will feed the ticket strip for a distance substantially the distance between the rear end of the hammer and the knives, and feed it through the knives. Therefore, it is observed that during the depression of the outer end of the lever 70 the ticket is printed and during the return movement of the lever 70 the ticket is fed. At the end of the return movement of the lever 70 to its normal position, the knife operates and severs the ticket so that it drops down in a receiver 86. This receiver is secured to the frame 55 between the walls thereof and projects through the slot 72 in the base.

The knife construction consists of one stationary knife 90 secured to the frame 55 and one movable knife 91 slidable in vertical guides 92 secured to the frame 55. The upper edge of the knife 90 is the cutting edge, while the knife 91 is loop-like in form with the lower edge of the upper part of the loop being the cutting edge, the two knives being arranged so that as soon as the knife 91 is elevated there will be space between the cutting edges of the two knives for the movement of the ticket. The knife 91 is elevated by an arm 93 therefrom being caught by a trip 94 pivoted on the lever 70. After the upper end of the lever 70 is depressed to its limit, then as the lever returns, the trip 94 lifts the knife 91 and at the same time, as heretofore explained, the ticket is fed through between the knives. When the lever 70 reaches its return limit of movement, the upper end of the trip 94 engages a pin 95 in the frame 55 which trips said trip 94 and disengages it from the arm 93 on the knife and by that time the ticket has been pushed outward to its full limit and then a spring 96 which extends downward from the knife 91 to the cross bar 97 in the frame 55, drops the knife 91 downwardly and it severs the ticket at the end of its downward movement which is limited by the pins 98 in the knife plate 90.

The lever 70 not only controls the operation of the hammer and feeding mechanism and knife construction, but it is also used for the lateral adjustment of the frame 55 and entire ticket marking mechanism so as to bring the ticket strip over the desired type wheel 50 which contains the price-per-unit of weight at which the commodity is being sold. Hence, the slot 72 extends transversely of the base and immediately above it a scale plate 99 is secured with graduations or numerals indicating the price-per-unit of weight and registering with the respective wheels 50 and by this the operator is enabled to know to what point to move the lever 70 and frame 55 in order to get the right data marked or printed on the ticket.

It is observed that the details of this machine may be varied in many respects without altering the principle of its general construction and operation.

I claim as my invention:

1. The combination with a weighing scale having a scale beam and a hollow base, of type means mounted in said hollow base and controlled by the scale beam for marking on a ticket data relating to the commodity being weighed, said scale base having graduations thereon representing the prices-per-unit of weight, and means movable along said graduations for adjusting said ticket with reference to said marking means.

2. The combination with a weighing scale having a scale beam, of an element carrying a series of rows of type indicating the total values of commodities weighed by the scale at varying prices-per-unit of weight, means actuated by the said scale beam for adjusting said type carrying element in proportion to the weight of the load on the scale beam, and ticket marking means movable into operating position with any of said rows of types in accordance with the desired price-per-unit of weight.

3. The combination with a weighing scale having a scale beam, of a shaft, an element carrying a series of type about the shaft representing data relating to the commodity to be weighed, a pinion on said shaft, a rack bar connected with the scale beam for engaging said pinion and giving said type carrying element revoluble movement, and ticket marking means movable into operating position with any of said rows of types in accordance with the desired price-per-unit of weight.

4. The combination with a weighing scale having a scale beam, of revoluble means carrying a plurality of annular series of type representing data relating to the commodities that may be weighed on the scale, means actuated by the scale beam for giving said type carrying means, revoluble movement in proportion to the weight of the commodity, a frame slidable over said series of type, a printing ribbon mounted in said frame in position to engage tangentially any one of said rows of type to which said frame may be moved, means for feeding a ticket above said ribbon, and a hammer for pressing the ticket and ribbon against the type for printing the ticket.

5. The combination with a weighing scale having a scale beam, of revoluble means carrying a plurality of annular series of type representing data relating to the commodities that may be weighed on the scale, means actuated by the scale beam for giving said type carrying means revoluble movement in proportion to the weight of the commodity, a frame sidable over said series of type, a printing ribbon mounted in said frame in position to engage tangentially any one of said rows of type to which said frame may be moved, means for feeding a ticket above said ribbon, a hammer for pressing the ticket and ribbon against the type for printing the ticket, and a single means for feeding the printing ribbon and causing the actuation of said hammer.

6. The combination with a weighing scale having a scale beam, of revoluble means carrying a plurality of annular series of type representing data relating to the commodities that may be weighted on the scale, means actuated by the scale beam for giving said type carrying means, revoluble movement in proportion to the weight of the commodity, a frame slidable over said series of type, a printing ribbon mounted in said frame in position to be moved to a position over any one of said series of type, means for feeding a ticket strip immediately over said ribbon and series of type, a hammer over said ticket strip, ribbon and series of type, a ticket severing means, and a lever which feeds the printing ribbon, causes the operation of the hammer, feeds the ticket strip and causes the operation of the ticket severing means.

7. The combination with a weighing scale having a scale beam, of revoluble means carrying a plurality of annular series of type representing data relating to the commodities that may be weighted on the scale, means acutated by the scale beam for giving said type carrying means revoluble movement in proportion to the weight of the commodity, a frame slidable over said series of type, a printing ribbon mounted in said frame in position to be moved to a position over any one of said series of type, means for feeding a ticket strip immediately over said ribbon and series of type, a hammer over said ticket strip, ribbon and series of type, a ticket severing means, a lever fulcrumed between its ends which in one movement feeds the printing ribbon and causes the actuation of the hammer and in its return movement feeds the ticket strip after it has been printed and moves the severing means to an operated position, and means for actuating the severing means at the end of the return movement of said lever.

8. The combination with a weighing scale having a scale beam and a hollow base, of means rotatably mounted in said base having on its periphery a series of types of numerals indicating total values at various prices-per-unit of weight, means actuated by the scale beam for giving said type carrying means revoluble movement, a frame laterally slidable in said base, ticket carrying means in said sliding frame adapted to hold a ticket over a series of types, a hammer in said sliding frame for causing an impression on said ticket from said series of types, means extending outside of the base for laterally sliding said frame and causing the operation of the ticket marking mechanism, and graduations on the base with numerals representing prices-per-unit of weight to enable the operator to move the ticket and hammer to the corresponding series of types, whereby the ticket will be marked with the total value of the article being weighed at the desired price-per-unit of weight.

9. The combination with a weighing scale having a scale beam, of an element carrying a plurality of type carrying members, each of said members having type thereon to print the price per pound, the weight and the corresponding computed cost, and means for adjusting said element in accordance with the deflection of the scale beam.

10. The combination with a weighing scale having a scale beam, of an element carrying a plurality of type carrying members, each of said members having type thereon to print the price per pound, the weight, and the corresponding computed cost, means for adjusting said element in accordance with the deflection of said scale beams, and ticket marking means movable into operative position in alinement with any one of the aforesaid type carrying members.

11. The combination with a weighing scale having a scale beam, of an element carrying a plurality of type carrying members, each of said members having type thereon to print the price per pound, the weight, and the corresponding computed cost, means for adjusting said element in accordance with the extent of deflection of the said scale beam, ticket marking means movable into operating position in alinement with any one of the aforesaid type members, and manually operated means for operating said ticket marking means.

In witness whereof, I have hereunto affixed my signature in the presence of the witnesses herein named.

BENJAMIN D. EMANUEL.

Witnesses:
G. H. BOINK,
O. M. McLAUGHLIN.